Jan. 14, 1930.  J. HILL  1,743,546
HEADLIGHT ADJUSTING AND FOCUSING DEVICE
Filed May 8, 1928  4 Sheets-Sheet 1

JAMES HILL,
INVENTOR,

BY  ATTORNEYS.

Jan. 14, 1930.   J. HILL   1,743,546
HEADLIGHT ADJUSTING AND FOCUSING DEVICE
Filed May 8, 1928   4 Sheets-Sheet 2
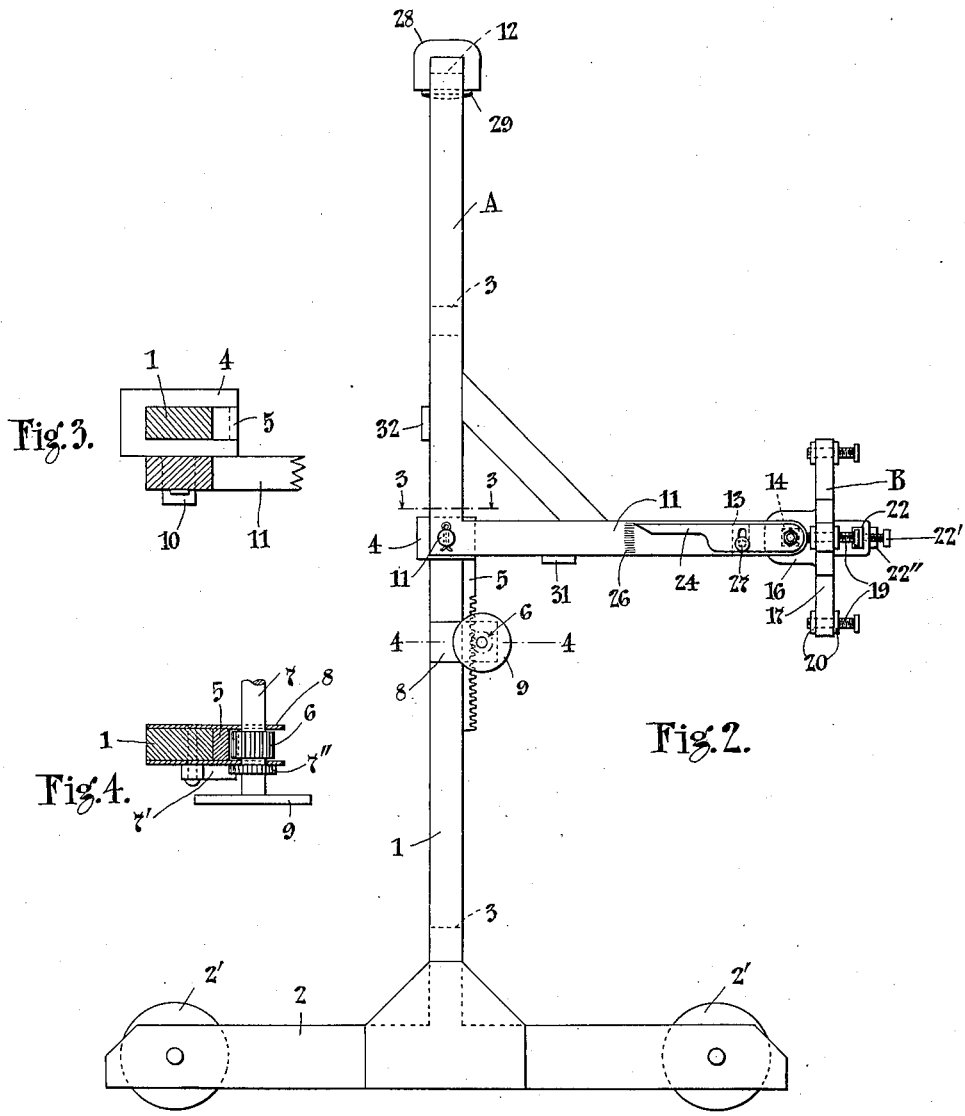
JAMES HILL,
INVENTOR,
BY
ATTORNEYS.

Jan. 14, 1930.　　　　　J. HILL　　　　　1,743,546

HEADLIGHT ADJUSTING AND FOCUSING DEVICE

Filed May 8, 1928　　　　4 Sheets-Sheet 3

JAMES HILL,
INVENTOR.

BY

ATTORNEYS.

Jan. 14, 1930.  J. HILL  1,743,546
HEADLIGHT ADJUSTING AND FOCUSING DEVICE
Filed May 8, 1928  4 Sheets-Sheet 4
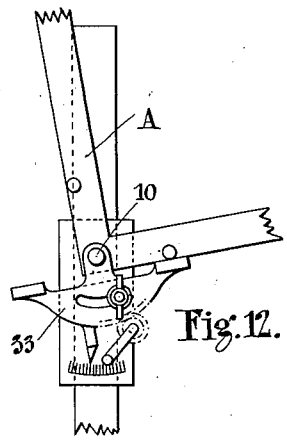
Fig. 12.
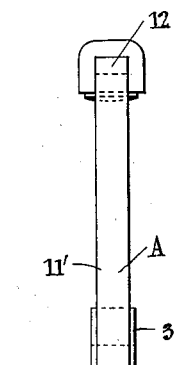
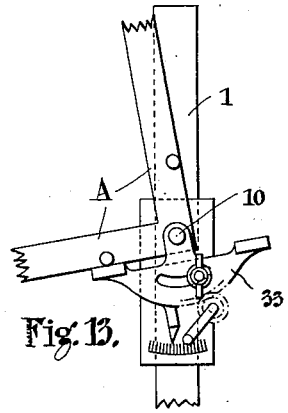
Fig. 13.
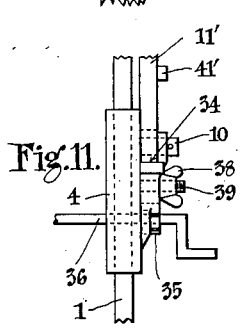
Fig. 11.
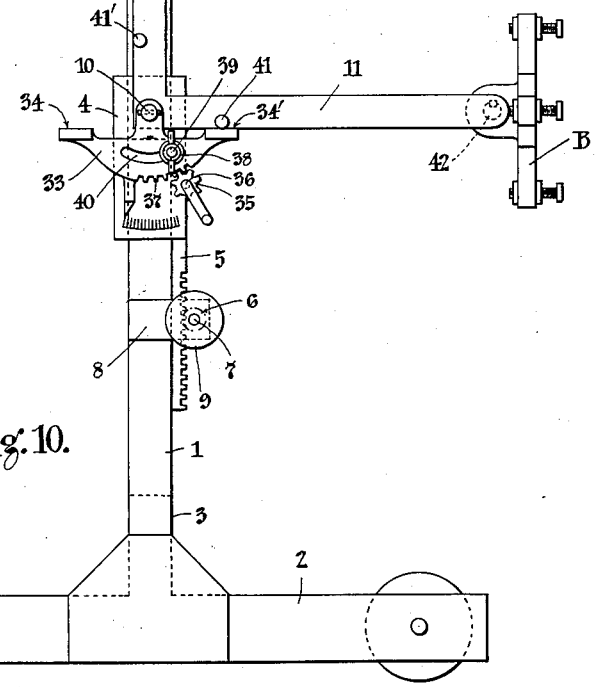
Fig. 10.
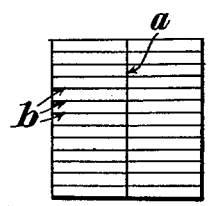
Fig. 14.
JAMES HILL,
INVENTOR.
BY
ATTORNEYS.

Patented Jan. 14, 1930

1,743,546

UNITED STATES PATENT OFFICE

JAMES HILL, OF MITCHELL, ONTARIO, CANADA

HEADLIGHT ADJUSTING AND FOCUSING DEVICE

Application filed May 8, 1928. Serial No. 276,143.

This invention relates to devices for facilitating the accurate adjustment and focusing of automobile headlights.

The customary method of adjusting headlights requires a considerable area of level floor space. It will not give satisfactory results unless it is carried out with great patience and care and it can only be performed in comparative darkness. It requires considerable time and, at best, can never be regarded as positive and certain since it depends entirely on the judgment of the eye and observations must be made at a considerable distance from the headlights themselves.

The object of the present invention is to provide a simple and compact device by means of which automobile headlights can be adjusted and focused with accuracy and certainty and without requiring any special skill or care. Moreover, the device may be employed in a small level area and in daylight.

Further objects of the invention will appear hereinafter.

The invention consists in the construction, combination and arrangement of parts hereinafter described and more fully pointed out in the appended claims.

Figure 1:
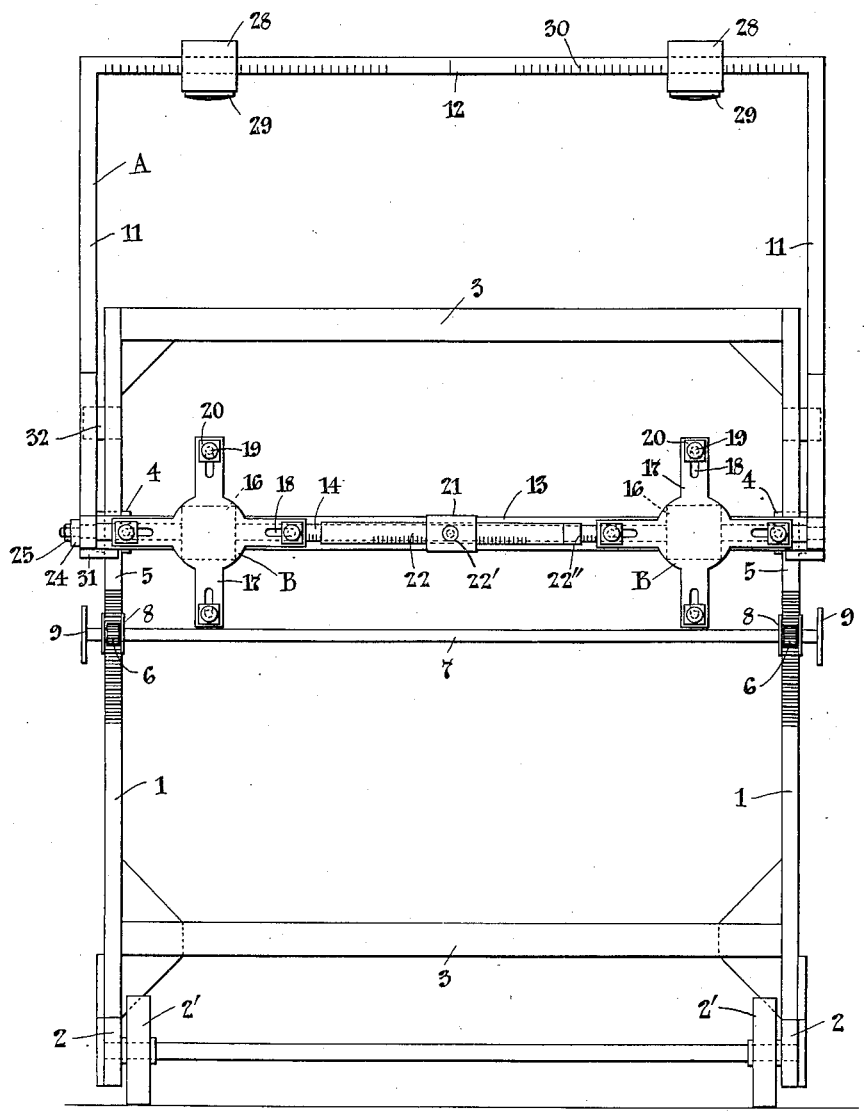
Figure 5:
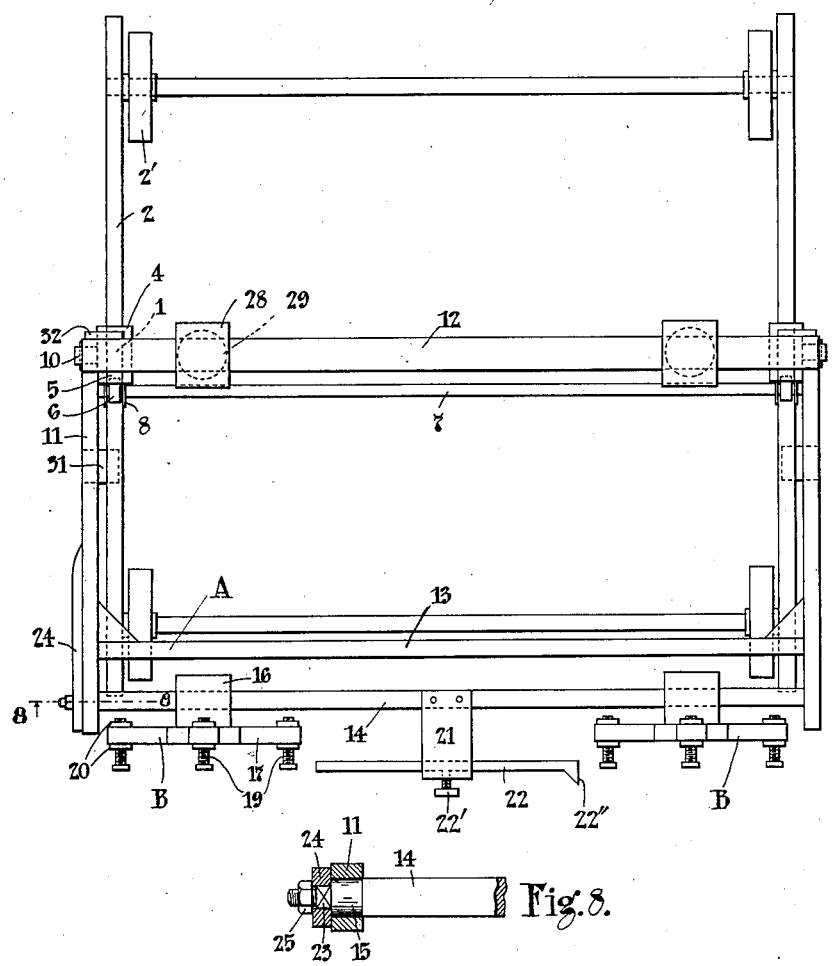
Figure 8:
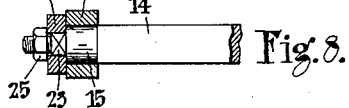
Figures 6, 7:
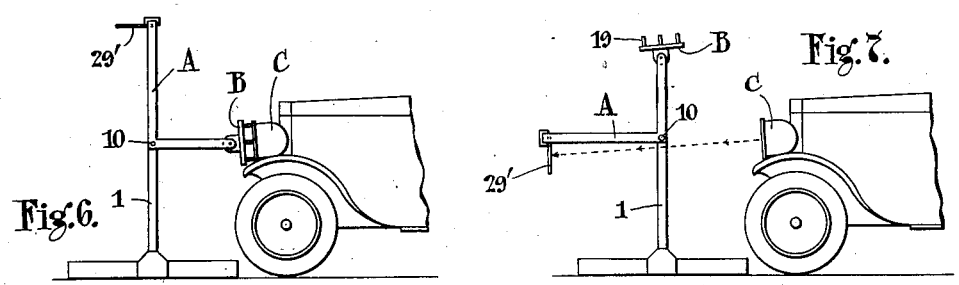
Figure 9:
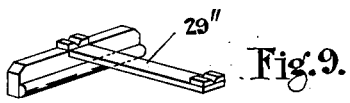

Referring now to the accompanying drawings, which illustrate, by way of example, one convenient embodiment of the invention:

Figure 1 is a front elevation;
Figure 2 is a side elevation;
Figure 3 is a section on line 3—3 of Figure 2;
Figure 4 is a section on line 4—4 of Figure 2;
Figure 5 is a plan view;
Figure 6 is a diagrammatic view of the device in use, in one position;
Figure 7 is a diagrammatic view of the device in use, in another position;
Figure 8 is a section of line 8—8 of Figure 5, and
Figure 9 is a perspective view of a sighting device which may be used in connection with the invention;
Figure 10 is a side elevation of another form of the invention;
Figure 11 is a rear elevation of a portion of Figure 10;
Figures 12 and 13 are side elevations of a portion of the device shown in Figure 10, illustrating the device in two different positions;
Figure 14 is a front elevation of a modified form of focusing plate.

The invention comprises an upright frame consisting of two standards 1 provided with base members 2 and connected by cross-bars 3. Wheels 2' may be mounted on the base members to render the device readily portable.

Slidably mounted on the standards 1 are U-shaped brackets 4 to which racks 5 are secured. The racks 5 depend from the brackets 4 and slide on the front surface of the standards 1. Pinions 6 in mesh with the racks 5 are carried by a shaft 7 mounted in bearings 8. The shaft 7 is provided with means, such as hand wheels 9, whereby the shaft 7 may be rotated. A pawl 7' engaging a ratchet 7" on the shaft 7 may be provided as shown in Figure 4 to prevent descent of the frame A except when the pawl is manually disengaged from the ratchet.

The brackets 4 are provided with trunnions 10 on which is pivotally mounted a frame A comprising two L-shaped members 11 connected by cross-bars 12 and 13.

Parallel to the cross-bar 13 and in front thereof, as viewed in Figure 5, is arranged a bar 14 of square, rectangular or other cross-section. This bar has portions 15 of circular section rotatably mounted in aligned holes in the L-shaped members 11. Slidably but non-rotatably mounted on the bar 14 are a pair of blocks 16 which carry lamp-centering devices B. These devices, as shown, comprise cross-shaped plates 17, which normally lie in a vertical or substantially vertical plane. The plate 17 is formed with radial slots 18 in which screws 19 are adjustably mounted by means of nuts 20. Instead of having the bar 14 of square section it may be of circular section and provided with a keyway engaged by keys in the blocks 16 (see 42 in Figure 10).

Secured to the middle of the bar 14 is a forwardly projecting block 21, in which a gauge bar 22 is mounted to slide laterally of the device. The bar 22 may be held in position by means of a set-screw 22'.

One end of the bar 14 may be formed with a square portion as at 23, see Figure 8, on which is mounted an index arm 24, secured in position by a nut 25. The free end of the arm 24 may be pointed as shown in Figure 2 and arranged to cooperate with graduations 26. Its movement may be limited by a pin 27 mounted in the member 11 and engaging an arcuate slot in the arm 24.

Mounted in a slidable but non-rotatable manner on the cross bar 12 are two blocks 28 which carry metal plates 29, the axis of each of which is vertical in one position of the frame A, see Figures 1, 2 and 5, and horizontal in the other position, see Figure 7. The discs 29 may be replaced by rectangular plates 29' which depend from the bar 12 when the frame A is in the position shown in Figure 7 and these plates may have a vertical centre line $a$ and horizontal graduations $b$ (see Figure 14).

The bar 12 is preferably provided with graduations, as at 30, and the bars 14 and 22 may be similarly graduated.

Means such as stop plates 31 and 32 are provided to limit the pivotal movement of the frame A.

In order to adjust headlights by means of the invention, the device is placed in front of the automobile with the centering devices B as near as possible to the headlights. The shortest distance between the headlights is measured and the bar 22 is adjusted to move the point 22'' to a distance of one half the shortest distance between the headlights. The bar 22 is then secured in its adjusted position by means of the set screw 22'. By moving the device to bring the point 22'' into contact with the right-hand headlight, the device can be accurately centered with respect to the automobile. The lamp-centering devices B are then adjusted to bring the heads of the screws 19 into contact with the lenses of the headlight C just inside the rims thereof, (see Figure 6).

The lamp-centering devices B can then be tilted to the desired degree by means of the arm 24 and scale 26, and the lamps loosened on their mountings and adjusted to a position with their lenses in contact with the screwheads 19. In this way the casings of the lamps can be quickly and accurately adjusted to bring them into exact parallelism with each other and to the same distance from the ground as each other.

The frame A is then swung over into the position indicated in Figure 7 and the blocks 28 adjusted on the bar 12 to bring them the same distance from the centre line as the centering devices B. The lamps are then lighted and the necessary adjustment of the lamp bulbs and reflectors is effected to focus the beams correctly at the desired angle. This adjustment may be readily and accurately effected, as indicated in Figure 7, by observing the images of the lamp filaments on the plates 29'. To facilitate correct observation of the images on the plates 29' a sighting device 29'', as illustrated in Figure 9, may be employed. This device is placed on top of the lamp being adjusted.

The form of the invention shown in Figures 10 to 13 comprises a frame having uprights 1, a wheeled base 2 and cross bars 3, as in the form previously described. A similar L-shaped frame A is also pivoted on trunnions 10 carried by brackets 4 from which depend racks 5 in mesh with pinions 6, mounted on a shaft 7, supported in brackets 8. Members 33 are pivotally mounted on the trunnions 10 and are provided with surfaces 34 and 34' arranged in line with each other. Means are provided for simultaneously adjusting the angular position of the members 33 and these means may comprise pinions 35 mounted on a spindle 36 supported in bearings on the brackets 4. The pinions 35 mesh with toothed sectors 37 on the bottom of the members 33, so that rotation of the pinions causes pivotal movement of the members 33 about the trunnions 10.

The members 33 may be clamped in adjusted position by means such as nuts 38 on a bolt 39 in a slot 40 in the member 33. The limbs of the side frame members 11 and 11' are provided with lateral projections 41 and 41' respectively.

The cross member 12 of the frame A carries a pair of slidable blocks 28 bearing plates 29 as in the previously described form.

In this modification the lamp-centering devices B do not need to be made angularly adjustable with respect to the frame A, but are splined on to a stationary cross member 42 and are therefore adjustable laterally.

In operation, the members 33 are adjusted angularly to move the frame A through the angle to which it is desired to dip the lamps, (see Figure 12). The lamp casings are then adjusted by means of the screw heads of the centering devices as previously described. It will be seen that in this form of device the lamp-centering devices B and plates 29 are simultaneously adjusted through the same angle when the member 33 is moved, so that when the frame A is swung over into the position shown in Figure 13 the axes of the lamp casings will be directly in line with the centre of the plates 29, and the final adjustment can then be made by merely focusing the images of the lamp filaments on the centre of the plates 29.

The sighting device shown in Figure 9 may be employed if desired by placing it on top of a headlight and sighting over the fore and back sights onto the focusing plate 29, to check the alignment of the headlight.

It will be understood that many modifications may be made without departing from the scope of the invention as defined in the appended claims.

The term "lamp-centering device" is employed in the claims for convenience and brevity and is intended to include any device, such as a plate or a plate having adjustable screws, against which the exterior of the headlights may be placed to cause them to assume the position and inclination to which the "lamp-centering devices" have been adjusted.

I claim:

1. A device for facilitating the adjustment of headlights comprising a supporting frame, a member pivotally mounted on said frame, and a plurality of lamp-centering devices carried by said member.

2. A device for facilitating the adjustment of headlights comprising a supporting frame, a member pivotally mounted on said frame and a pair of lamp-centering devices carried by said member and adjustable with respect to said member.

3. A device for facilitating the adjustment of headlights comprising a supporting frame, a member pivotally mounted on said frame and a pair of lamp-centering devices carried by said member and adjustable with respect to said member, and arranged side by side in a plane parallel to the pivotal axis of said member.

4. A device for facilitating the adjustment of headlights comprising a supporting frame, a member having two horizontally disposed bars and pivoted to swing about a horizontal axis on said frame, said bars being parallel to said horizontal axis, lamp-centering devices mounted on one of said bars and focusing plates mounted on the other bar, said lamp-centering devices and focusing plates being adjustable longitudinally of the respective bars on which they are mounted.

5. A device for facilitating the adjustment of headlights comprising a supporting frame, a member pivotally mounted on said frame, a pair of lamp-centering devices carried by said member, a pair of focusing plates carried by said member and in a plane disposed at right angles to the plane of the lamp-centering devices, means for vertically adjusting said member on said frame, and means for limiting the pivotal movement of said member to ninety degrees.

6. A device for facilitating the adjustment of headlights comprising a supporting frame, a member pivoted on said frame, said member including L-shaped side elements connected by parallel cross bars, brackets on said frame, aligned trunnions on said brackets engaging bearings in said side members, means for vertically adjusting said brackets, a pair of slidable blocks non-rotatably mounted on one of said cross bars, plates carried by said blocks and arranged normally parallel to the plane containing the remote limbs of said side elements, a pair of slidable blocks non-rotatably mounted on the other of said cross bars, focusing plates carried by said last mentioned blocks and arranged in a plane at right angles to said plates, and means for limiting the angular movement of said member to ninety degrees.

7. A device as claimed in claim 6, wherein means are provided for varying the angular position of said member independently of the said limited angular movement of ninety degrees.

8. A device as claimed in claim 6, wherein depending brackets are pivotally mounted on said trunnions for limiting the angular movement of said member with respect to the bracket to ninety degrees, means being provided for adjusting the angular position of said depending brackets with respect to said supporting frame.

9. A device for facilitating the adjustment of headlights comprising a supporting frame, a member pivotally mounted on said frame, a plurality of lamp-centering devices carried by said member and means for vertically adjusting said member on said frame.

In testimony whereof I have affixed my signature.

JAMES HILL.